United States Patent [19]
Aikoh et al.

[11] Patent Number: 5,150,350
[45] Date of Patent: Sep. 22, 1992

[54] MAGNETO-OPTICAL DATA RECORDING AND REPRODUCING DEVICE

[75] Inventors: Hideki Aikoh, Higashiosaka; Tohru Nakamura, Katano; Masayuki Shinoda, Moriguchi; Noboru Kikuchi, Hirakata, all of Japan

[73] Assignee: Matsushita Electric Industrial Co., Ltd., Osaka, Japan

[21] Appl. No.: 403,446

[22] Filed: Sep. 6, 1989

[30] Foreign Application Priority Data

Sep. 9, 1988 [JP] Japan .................. 63-227009

[51] Int. Cl.$^5$ .............................................. G11B 5/09
[52] U.S. Cl. .................... 369/112; 364/44.11; 364/44.38; 364/44.37
[58] Field of Search ............... 369/44.12, 44.14, 44.11, 369/44.23, 44.27, 44.32, 44.38, 44.33, 44.31, 44.37, 44.41, 44.42, 100, 110, 112, 116; 250/201; 360/114

[56] References Cited

U.S. PATENT DOCUMENTS

4,773,053 9/1988 Gottfried .................... 369/44.38 R
4,804,835 2/1989 Ando ........................ 369/44.37 R

FOREIGN PATENT DOCUMENTS

62226454 10/1987 Japan .

OTHER PUBLICATIONS

Trichepps WS86 Chapt. V Optical Head and Data Reproducing Property (pp. 81-95) p. 93 by Sanyo Electric Motors, Ltd.

*Primary Examiner*—Roy N. Envall, Jr.
*Assistant Examiner*—Hung Dang
*Attorney, Agent, or Firm*—Stevens, Davis, Miller & Mosher

[57] ABSTRACT

A magneto-optical data recording and reproducing device for storing data in a data memory medium which applies modulation to a plane of polarization, erasing data therefrom and reproducing data stored therein, comprises a light source for emitting a light beam with linear polarization, a light spot forming means for condensing the light beam emitted from the light source and forming a light spot on the data memory medium, a beam splitting means, located between the light source and the light spot forming means, to which reflected light beams from the data memory medium are applied and splitted, a beam detecting prism, to which light beams splitted by the beam splitting means are applied, providing the polarizing function that a predetermined first pencil of light beam with linear polarization is reflected while a second pencil of light beam with linear polarization crossing the first pencil at right angles is transmitted, a beam splitting prism, being located near or adhered to the beam detecting prism, for splitting the second pencil of light beam with linear polarization transmitted through the beam detecting prism into two subpencils with approximately the same quantity of light, reflecting the splitted subpencils and then re-allying them to the beam detecting prism to form two optical axes extending along approximately the same direction as that of the first pencil of light beam with linear polarization, at least one or more photo detector to which a plurality of light beams having passed through the beam detecting prism and the beam splitting prism are applied, a data retrieval unit for retrieving data in the data memory medium according to output of the photo detector, a tracking servo unit to which a tracking error signal picked up by the output of the beam detector is applied, and a driving means for driving at least the light spot forming means in response to an output signal from the tracking servo unit.

5 Claims, 7 Drawing Sheets

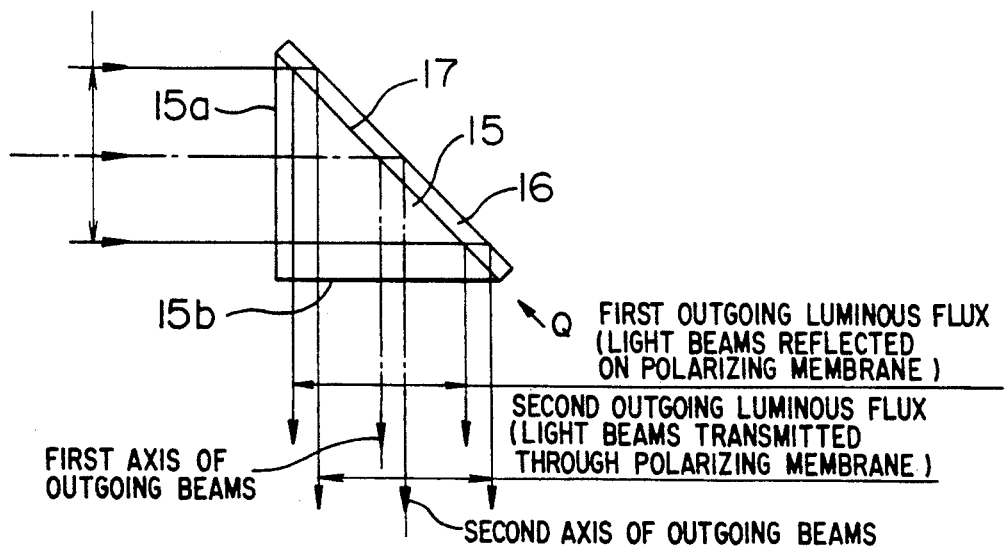
FIG. 2b
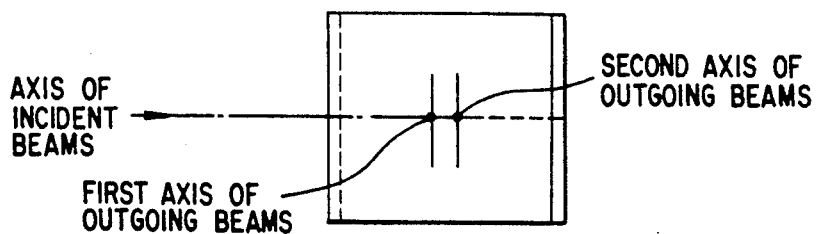
FIG. 2c VIEW TAKEN ALONG DIRECTION Q
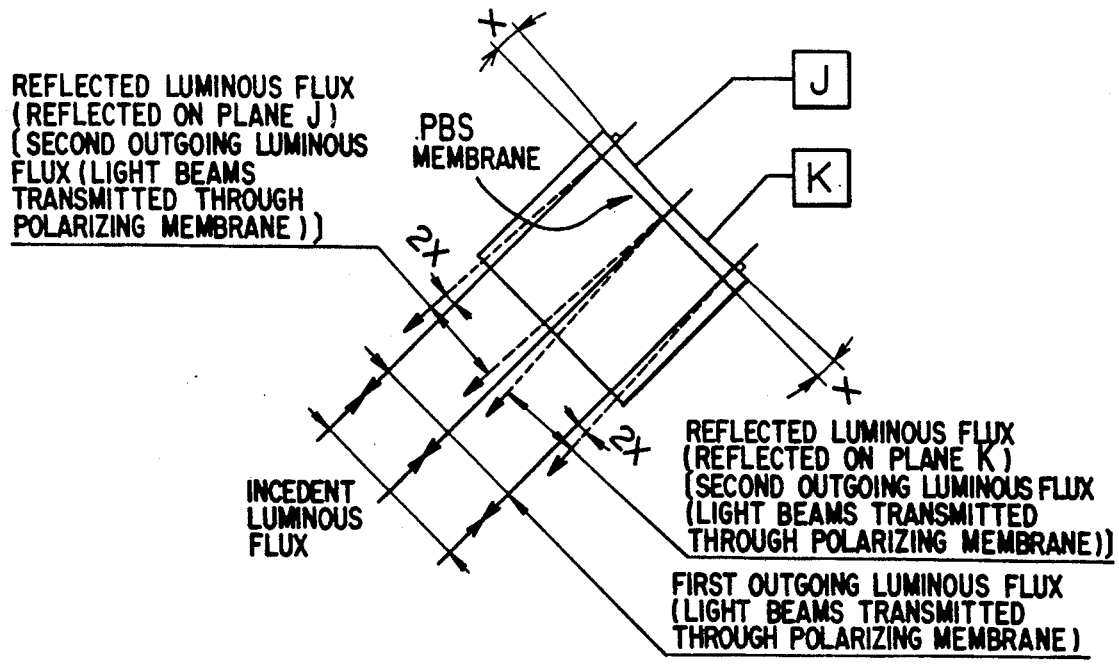

TOO NEAR    LIGHT-GATHERING    TOO FAR
            PLANE

MAGNETO-OPTICAL DATA RECORDING AND REPRODUCING DEVICE

BACKGROUND OF THE INVENTION

1. Field of the Invention

The present invention relates to magneto-optical data recording and reproducing device wherein a data memory medium which applies modulation to a plane of polarization is subjected to the radiation of optical beams such as laser beams to store, reproduce or erase data.

2. Description of the Prior Arts

FIG. 6 is a schematic view of a conventional magneto-optical data reproducing device, disclosed in "*Tricheps* WS86 Chapt. V Optical Head and Data Reproducing Property (pp. 81-95) p. 93" by Y. ISHII, Sanyo Electric Motors, Ltd.

In FIG. 6, reference numeral 1 is a semi-conductor laser, 2 is a collimater lens, 3 is a beam splitter, 4 is an objective lens for forming a light-gathering part 5 is a data memory medium, 6 is a half wavelength plate, 7 and 8 are single lenses, 9 is a polarized beam splitter, 10 is a cylindrical lens, 11 and 12 are beam detectors, 21 and 22 are differential amplifiers, and 22 is an operational amplifier.

A divergent light beams with linear polarization emitted from the semiconductor laser 1 is converted into a parallel ray beam while passing through the collimater lens 2. The parallel ray beam then transmits through the beam splitter 3 and the objective lens 4 to the data memory medium 5, to form a light spot thereon.

A light beams reflected from the data memory medium 5, having passed through the objective lens 4, is partially reflected by and transmitted through the beam splitter 3. The reflected beam from the data memory medium 5 is transmitted through the half wavelength plate 6, whereby its plane of polarization is rotated by an angle of 45 degrees. Thereafter, the beams having passed through the single lenses 7, 8 are split into two pencil light beams with linear polarization each crossing the other at right angles by the polarized beam splitter 9. Herein, two of the single lenses 7, 8 for condensing the light beams are installed to constitute a telefocus unit.

The light beam reflected by the polarized beam splitter 9 is gathered by the cylindrical lens 10 and applied to the photo detector 11. On the other hand, the light beam having passed through the polarized beam splitter 9 is applied to the other photo detector 12.

Data retrieval is performed as follows. Since the reflected flux of the semiconductor laser beam with linear polarization applied to the data memory medium 5 has a plane of wave polarization rotated in response to the direction of a magnetic field by the Kerr effect, outputs from the photo detectors 11, 12 are changed according to the direction of the magnetic field. Herein, a differential detecting unit comprising the differential amplifier 21 for detecting a difference between the output of the photo detector 11 and the output of the photo detector 12, i.e. output of the operational amplifier 22, is disposed to eliminate noise from the data memory medium 5. Thus, data is accurately reproduced.

As for the detection of an error signal in this constitution, a focus error detecting unit according to an astigmatism method comprises the signal lenses 7, 8, the cylindrical lens 10 and the photo detector 11, while a tracking error detecting unit according to a push-pull method comprises the single lenses 7, 8 and the photo detector 12.

The tracking error detecting unit according to the push-pull method will now be explained in detail. The photo detector 12 to be used in the push-pull method is a two-piece photo detector. By locating the photo detector 12 at a position where light beams applied thereto are split into two equal pencil beams, the diffraction distribution of a light beam by the edge of a guide channel in the track of the data memory medium 5 can be measured. In other words, differential amplifier 23 computes a difference between outputs from two light beam-receiving domains so as to obtain a tracking error signal.

FIG. 7 shows the details of the tracking error detecting unit disclosed in "*Trichepps* WS86 Chapt. V Optical Head and Data Reproducing Property (pp. 81-95) p. 85" by Y. ISHII, Sanyo Electric Motors, Ltd.

Focus error detection according to the astigmatism method will now be explained in detail. In the astigmatism method, the cylindrical lens 10 is located in an optical path, so as to detect a change in the configuration of a beam caused by the aberration of a focal point. When the data memory medium 5 is located at the focal point, the four-piece photo detector 11 is disposed in a manner such that the configuration of a beam on the four-piece photo detector 11 becomes a true circle. A focus error signal can be obtained by computing a difference between signals obtained from two (diagonally positioned) domains of four light 11. The focus error detection is concretely illustrated in FIG. 8 (see "*Trichepps* WS86 Chapt. V Optical Head and Data Reproducing Property (pp. 81-95) p. 84" by Y. ISHII, Sanyo Electric Motors, Ltd.)

These conventional magneto-optical data recording and reproducing devices have the disadvantage that the optical system is inevitably large in size, since there is used a beam detecting means, whereby a light beam are split into two pencil beams each crossing the other at right angles by a polarized beam splitter, each of the split pencil beams is respectively condensed and then applied to two photo detectors 11, 12. In addition, for push-pull detection, it is necessary to determine the position of the photo detector 12 while detecting an error signal, in a case where the device is to be adjusted on assembling. Also, when push-pull detection is performed with a relatively small light spot formed on the photo detector 12 from a light beam condensed by the single lenses 7, 8, a drift in a tracking error signal is likely to be caused by a change in temperature. This drift can be inhibited by performing the push-pull detection with a relatively large light spot formed on the photo detector 12. However, numerous disadvantages are derived thereby. For instance, the photo detector 12 itself becomes large in size. Also, a detector signal in a high frequency range can not be obtained.

SUMMARY OF THE INVENTION

It is a primary object of the present invention to solve the above problems in the conventional magneto-optical data recording and reproducing device.

It is another object of the present invention to provide a magneto-optical data recording and reproducing device having an optical system of a small size, which enables the performance of push-pull detection as a tracking error detecting method with less possibility of the formation of a drift caused by a change in temperature without the necessity of determining the position of a beam detector while detecting an error signal during the adjustment of the device on assembling, and by which a detecting signal can be obtained even in a high frequency range.

According to the present invention, a magneto-optical data recording and reproducing device, whereby data is stored in or erased from a data memeory medium which applies modulation to a plane of polarization and stored data is reproduced, comprises a light source for emitting a light beam with linear polarization, a light spot forming means for condensing the light beam emitted from the light source and forming a light spot on a data memory medium, a light beam splitting means located between the light source and the light spot forming means, for receiving a light beam reflected from the data memory medium and splitting the light beam, a beam detecting prism providing a polarizing function such that a predetermined first pencil beam of the light beam with linear polarization is reflected while a second pencil of the light beam with linear polarization crossing the first pencil at right angles is transmitted, a light beam splitting prism located near or adhered to the beam detecting prism for splitting the second pencil beam with linear polarization transmitted through the beam detecting prism into two equal subpencil beams reflecting the split subpencil beams reapplying them to the beam detecting prism so as to form two optical axes extending along approximately the same direction as that of the first pencil beam with linear polarization, at least one or more photo detectors to which a plurality of beams having passed through the beam detecting prism and the beam splitting prism are applied, a data retrieval unit for retrieving data in the data memory medium according to an output of the photo detector, a tracking servo unit to which a tracking error signal detected by the output of the photo detector is applied, and a driving means for driving at least the light spot forming means in response to an output signal from the tracking servo unit.

The beam detecting prism may be a right-angled triangular prism providing a polarizing function on its oblique plane.

The light beam splitting prism may be preferably one which splits the second pencil light beam with linear polarization into two subpencil beams along a direction approximately parallel to an image in a data track of the data memory medium.

The beam splitting prism may be one which has two reflector surfaces existing in different planes.

There may be disposed a light beam condensing means in front of or at the rear of the beam detecting means and the beam splitting means.

According to the constitution afore-mentioned, a predetermined first pencil beam in a reflected beam from the data memory medium is reflected by the polarizing function of the beam detecting prism. On the other hand, the second pencil beam with linear polarization crossing the first pencil beam at right angles is transmitted through the polarizing function of the beam detecting prism and applied to the beam splitting prism located near or adhered to the beam detecting prism, whereby the second pencil beam is spatially split into two subpencil beams with approximately the same quantity of light, reflected and then re-applied to the beam detecting prism. The subpencil beams are retransmitted through the polarizing function and turned into a state having two optical axes extending substantially in the same direction as that of the first pencil beam with linear polarization.

Consequently, the first and second pencil beams with linear polarization for detecting a data signal are obtained as beams having optical axes extending along the same direction, so that the beam detecting device can be put together at one position to achieve a smaller-sized. In addition, since the second pencil beam with linear polarization is split into two subpencil beams, it is not necessary to determine the position of the beam detector while detecting an error signal at the time of adjusting the system on assembling for performing push-pull detection as the tracking error detecting method.

Moreover, since splitting the second pencil beam with linear polarization into two subpencil beams is performed in a state such that a luminous flux has a large diameter, a tracking error signal can be picked up by the push-pull detection method which develops very little drift caused by a change in temperature. The two subpencil beams formed by splitting the second pencil beam with linear polarization are gathered by the beam condensing means to form small light spots each existing on a different light beam-receiving domain on the beam detector, so that the beam detector itself can be made smaller in size and so that a detecting signal can be obtained even in a high frequency range. Thus, the magneto-optical data reproducing device according to the present invention provides various advantages as discussed above.

BRIEF DESCRIPTION OF THE DRAWINGS

FIGS. 2a, 2b and 2c are detailed views of a beam detecting means of the above embodiment.

DESCRIPTION OF THE PREFERRED EMBODIMENT

Figure 1:
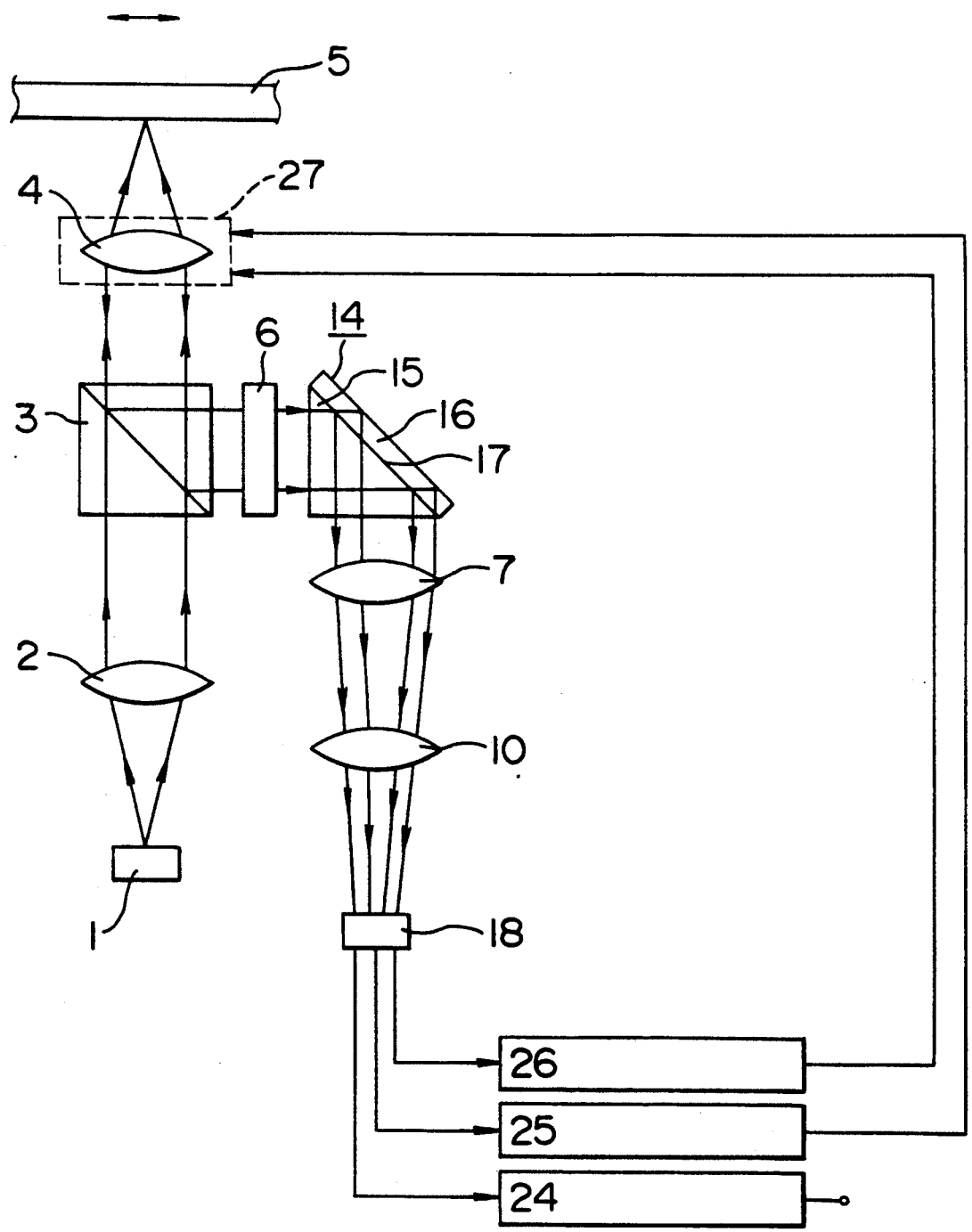
FIG. 1 is a schematic view of a magneto-optical data reproducing device as an embodiment of the present invention.

FIG. 1 is a schematic view of a magneto-optical data reproducing device as an example of the present invention, while its beam detecting means is illustrated in detail in FIGS. 2a, 2b and 2c.

Figure 6:
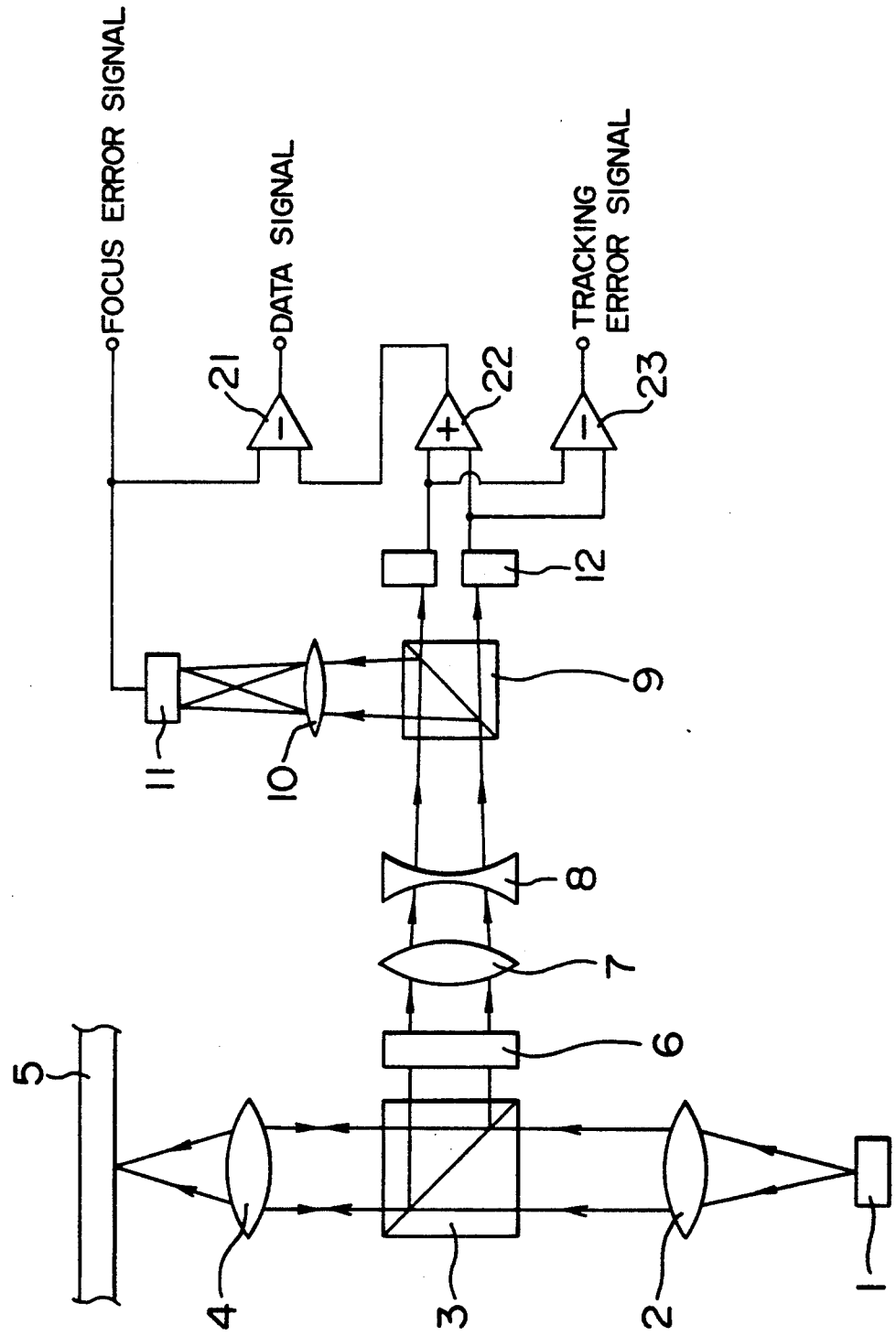
FIG. 6 is a schematic view of a conventional magneto-optical data reproducing device.
Figure 7:
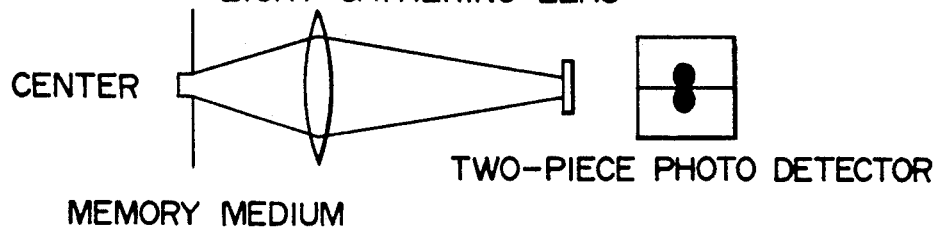
FIG. 7 is a detailed view for explaining tracking error detection in the prior art.
Figure 7:
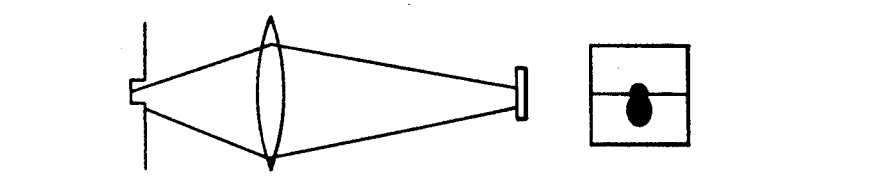
Figure 7:
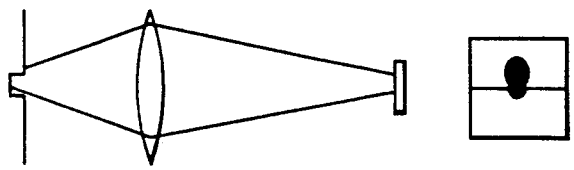

In FIG. 1 reference numeral 1 is a semiconductor laser as a light source for emitting a divergent light beam with linear polarization, 2 is a collimator lens functioning as a parallel ray beam forming means for converting the divergent light beam emitted from the semiconductor laser 1 into a parallel ray light beam, 5 is a data memory medium which applies modulation to a plane of polarization, 3 is a beam splitter functioning as a beam splitting means for receiving a light beam reflected from the data memory medium 5 and splitting the light beam, 4 is an objective lens functioning as a light spot forming means for forming a light spot on the data memory medium 5, and 6 is a half wavelength plate. A beam condensing means comprises a single lens 7 and a cylindrical lens 10. The constituents afore-mentioned are the same as those shown in FIG. 6. Herein, a memory track of the data memory medium 5 is oriented parallel to the surface of the paper sheet as shown in the drawings.

A beam detecting means 14 comprises a right-angled triangular prism 15 as a beam detecting prism and a light beam splitting prism 16 adhered to an oblique surface of the right-angled triangular prism 15. The beam splitting prism 16 has two reflector surfaces which exist in different planes and which are different from the adhered surface. On the adhered oblique surface of the right-angled triangular prism 15 there is disposed a polarizing membrane 17 providing a polarizing function such that a predetermined first pencil beam with linear polarization (S-polarized light) is reflected, while a second pencil beam with another linear polarization (P-polarized light) crossing the first pencil beam at right angles is transmitted. This beam detecting means 14 is located as shown in FIGS. 2a, 2b and 2c, in a manner such that one surface 15a making a right angle of the right-angled triangular prism 15 with the other surface 15b is held at a position facing normally to the light beam reflected from the data memory medium 5, while an incident luminous flux is reflected on the oblique surface of the right-angled triangular prism 15 and then emitted through the other surface 15b making a right angle of the right-angled triangular prism 15 with the surface 15a. Reference numeral 18 denotes a photo detector.

Thus, a focus error detecting means and a tracking error detecting means are constituted by the beam detecting means 14, the single lens 7, the cylindrical lens 10 and the photo detector 18.

Reference numeral 24 is a data retrieval unit for picking up data from the data memory medium 5 in response to an output of the photo detector 18. 25 is a tracking error servo unit to which a tracking error signal detected by the output of the photo detector 18 is applied. 26 is a focus error servo unit to which a focus error signal detected by the output of the beam detector 18 is applied. 27 is a driving means for driving the objective lens 4 in response to a control signal from the tracking servo unit 25 and the focus servo unit 26.

The divergent light beam with linear polarization emitted from the semiconductor laser 1 (1) is converted into a parallel ray light beam as it passes through the collimator lens 2, (2) is transmitted through the beam splitter 3 and the objective lens 4, and (3) forms a light spot on the data memory medium 5. The reflected light beam from the data memory medium 5 after having passed through the objective lens 4 is partially reflected by and transmitted through the beam splitter 3. The reflected light beam, which has a plane of polarization rotated with an angle of 45 degrees by the half wavelength plate 6, is applied to the beam detecting means 14. The operation mentioned so far is the same as that in the conventional method shown in FIG. 6.

Of light reflected from the data memory medium 5 and then applied normally to the surface 15a of the right-angled triangular prism 15 functioning as a member of the beam detecting means 14, the S-polarized light is reflected on the polarizing membrane 17 having a polarizing function formed between the oblique surface of the right-angled triangular prism 15 and the surface of the light beam splitting prism 16 adhered to the prism 15 functioning as members of the beam detecting means 14. On the other hand, the P-polarized light is transmitted through the polarizing membrane 17, spatially split into two subpencil beams at two reflector surfaces existing in different planes, of the beam splitting prism 16 adhered to the oblique surface of the right-angled triangular prism 15 and then reflected. The reflected subpencil beams split from the P-polarized light are re-transmitted through the polarizing membrane 17 disposed on the oblique surface of the right-angled triangular prism 15, and then emitted from the other surface 15b of the right-angled triangular prism 15 at approximately right angles in the condition wherein their optical axes extend along approximately the same direction as that of the S-polarized light reflected from the polarizing membrane 17.

The reflected light from the data memory medium 5 is an incident luminous flux having an axis of incident beam normal to the surface 15a of the right-angled triangular prism 15. In this incident luminous flux, the S-polarized light is reflected on the polarizing membrane 17 disposed on the oblique surface of the right-angled triangular prism 15, and emitted as a first outgoing luminous flux having a first outgoing optical axis normal to the other surface 15b of the right-angled triangular prism 15.

On the other hand, the P-polarized light is transmitted through the polarizing membrane 17 and applied to the beam splitting prism 16 adhered to the oblique surface of the right-angled triangular prism 15. The beam splitting prism 16 has two reflector surfaces J, K, which are not present in one and the same plane and which make equal angles (X) to the adhered surface, i.e. the polarizing membrane 17, as shown in FIG. 2c which is a view illustrating the beam detecting means 14 in FIG. 2a taken along the direction Q.

The P-polarized light applied to the beam split prism 16 is spatially splitted into two subpencil beams by the reflector surfaces J, K. The subpencil beams turn into luminous fluxes each having an angle (2×) therebetween. The P-polarized light as the split and reflected subpencil beam is re-transmitted through the oblique plane having the polarizing membrane 17, and then applied as a second outgoing luminous flux having a second outgoing optical axis approximately normal to the other surface 15b of the right-angled triangular prism 15.

Accordingly, the reflected light from the data memory medium 5 after having passed through the beam detecting means 14 is split into the S-polarized light and the P-polarized light. Both the S-polarized light and the P-polarized light are emitted as the first and second outgoing luminous fluxes respectively having first and second optical axes of outgoing beams extending along approximately the same direction with approximately right angles to the other surface 15b of the right-angled triangular prism 15. These emitted light beams are all gathered by the single lens 7 and the cylindrical lens 10, and then applied to the photo detector 18.

The output of the photo detector 18 is fed through the data retrieval unit 24, so that data in the data memory medium 5 can be retrieved. A tracking error signal and a focus error signal, each detected by the output of the beam detector 18, are applied to the tracking servo unit 25 and the focus servo unit 26, respectively. Control signals each outputted from the tracking servo unit 25 and the focus servo unit 26 are applied to the driving means 27 for driving the objective lens 4, so as to control the objective lens 4 in a manner such that the beam spot is positioned on a predetermined data track while the focus of objective lens 4 is placed on the data memory medium 5.

Figure 3:
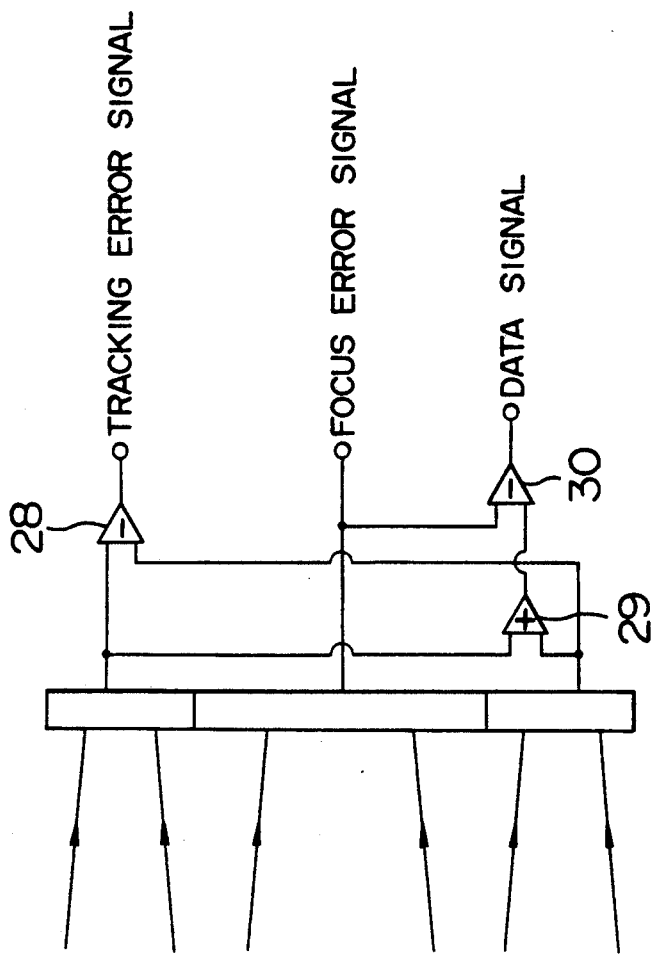
FIG. 3 is a detailed view for explaining tracking error detection in the above embodiment.
Figure 3:
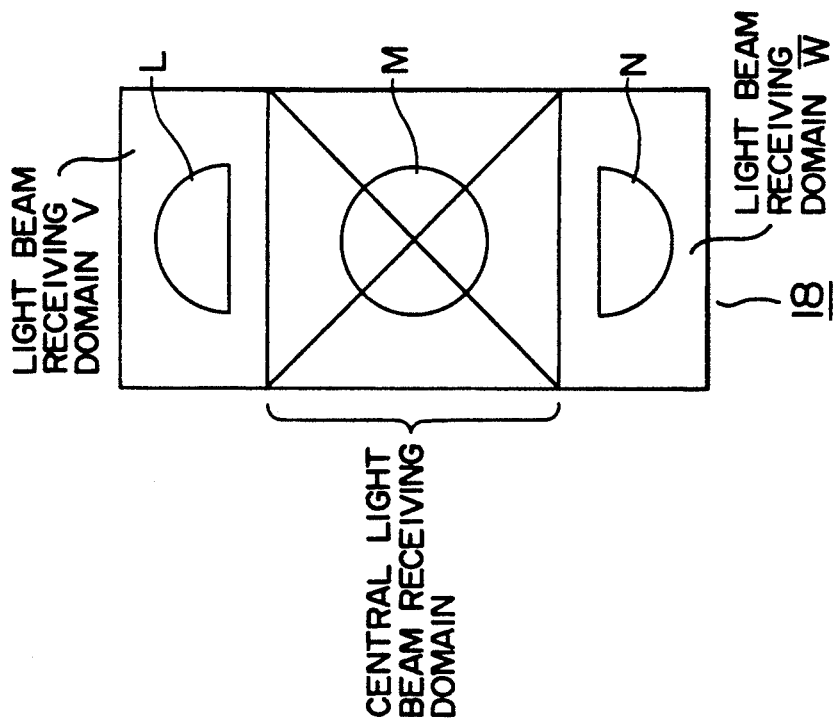
Figure 8:
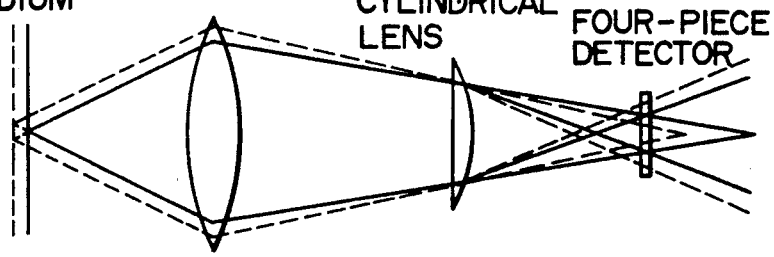
FIG. 8 is a detailed view for explaining focus error detection in the prior art.
Figure 8:
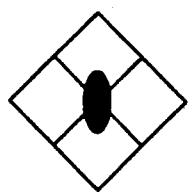
Figure 8:
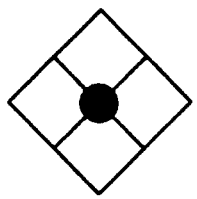
Figure 8:
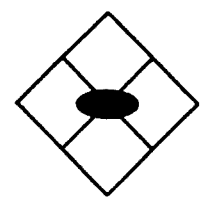

FIG. 3 is a detailed view for explaining data retrieval, focus error detection and tracking error detection in the above embodiment of the present invention. In FIG. 3, reference numerals 28, 30 denote differential amplifiers, and 29 denotes an operational amplifier. The photo detector 18 is a multi-partitioned beam detector. The light beam (the first outgoing pencil beam emitted from the beam detector 14, the S-polarized light), which is gathered by the single lens 7 and the cylindrical lens 10 and then applied to a light beam-receiving domain at the center, form a light spot M by which a focus error signal can be detected using the astigmatism method shown in FIG. 8.

On the other hand, the light beam (the second outgoing pencil beam, the P-polarized light) split into two subpencil beams by the beam detector 14 is gathered by the single lens 7 and the cylindrical lens 10, and then applied to two light beam-receiving domains V, W existing at both sides of the central light beam-receiving domain, so as to respectively form semicircular light spots L, N. The tracking error signal can be picked up according to the push-pull method by detection the difference between detecting signals in the light beam-receiving domains V and W by the differential amplifier 28.

Data retrieval is performed as follows. Since the plane of wave polarization of a reflected semiconductor laser beam applied to and reflected from the data memory medium 5 is rotated by the Kerr effect in response to the direction of a magnetic field, outputs from the central light beam-receiving domain (for S-polarized light) and the adjacent light beam-receiving domains (for P-polarized light) are changed in response to the direction of the magnetic field in the photo detector 18 having the above structure. In addition, to eliminate noise from the data memory medium 5, there is employed a differential detecting mechanism wherein a difference between an operational output (output of the calculating amplifier 29) from the adjacent light beam-receiving domains V, W (for P-polarized light) and an output from the central light beam-receiving domain (for S-polarized light) is picked up by the differential amplifier 30 to reproduce data.

In this example as afore-mentioned, the beam detecting means 14 comprises the right-angled triangular prism 15, and the beam splitting prism 16 being adhered to the oblique surface of the right-angled triangular prism 15 and having two reflector surfaces K, J which exist in different planes and which are different from the adhered oblique surface. Herein, the polarizing membrane 17 for reflecting the S-polarized light while transmitting the P-polarized light is disposed on the adhered oblique surface of the right-angled triangular prism 15. This beam detecting means 14 is disposed in a manner such that the surface 15a making a right angle of the right-angled triangular prism 15 is located at a position facing normally to light beams reflected from the data memory medium 5, while an incident luminous flux is reflected on the oblique surface of the right-angled triangular prism 15 and then emitted through the other surface 15b making a right angle of the right-angled triangular prism 15.

Due to this constitution, the S-polarized light and the P-polarized light for picking up a data signal are obtained as the pencil beams having optical axes extending along the same direction. Consequently, the elements for data retrieval, focus error detection and tracking error detection can be put together into a single beam detector so that the optical system can be substantially smaller in size, as compared with the conventional system wherein it has been necessary to locate a plurality of photo detectors at different positions.

In addition, although the adjustment of the photo detector 18 is required for the focus error detection, it is not necessary to determine the position of the photo detector 18 while picking up a tracking error signal during the adjustment of the system on assembling for performing push-pull detection as the tracking error detecting method, since the P-polarized light is previously splitted into two subpencil beams. The splitting of the p polarized light into two subpencil beams is done under the condition that the P-polarized light is a luminous flux of a parallel ray light beam having a large beam diameter, so that the tracking error signal can be picked up by the push-pull detection method which forms very little drift caused by a change in temperature. In addition, the subpencil beams split from the P-polarized light are gathered by the single lenses 7, 8 and the cylindrical lens 10 and then applied to the respective light-receiving domains V, W of the photo detector 18 to form small light spots thereon, so that the photo detector 18 itself can be made smaller in size and so that a detecting signal can be obtained even in a high frequency range. Consequently, the optical system is small in size, and the operation for determining the position of the photo detector while detecting an error signal during the adjustment of the system on assembling for performing push-pull detection as the tracking error detecting method can be omitted. Moreover, a tracking error signal can be detected by the push-pull detecting method which forms very little draft caused by a change in temperature, the photo detector itself can be made smaller in size, and a detecting signal can be obtained even in a high frequency range.

Figure 4A:
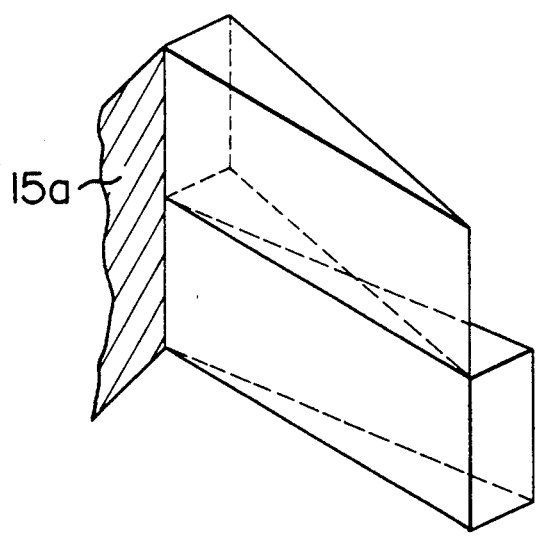
FIGS. 4a and 4b are perspective views of beam splitting prisms in other embodiments.
Figure 4B:
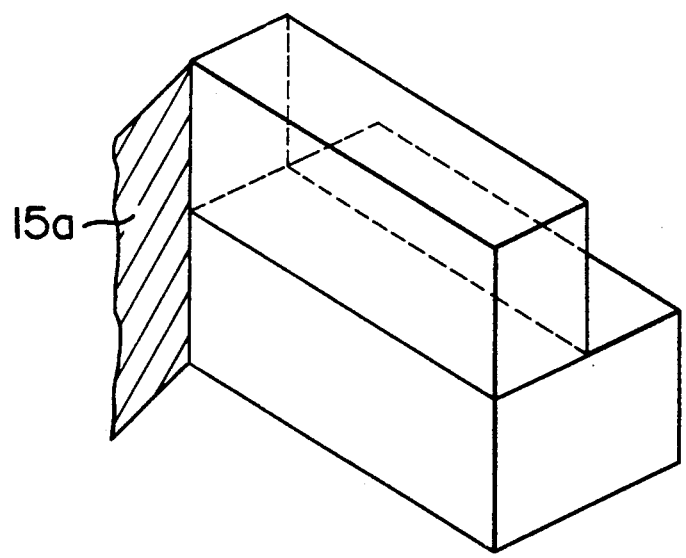

In the above example, the beam splitting prism 16 has the configuration that there are two reflector surfaces J, K existing in different planes which extend at equal angles (X) opposite to the other with respect to the adhered surface, i.e. the polarizing membrane 17. The configuration of the beam splitting prism 16 is not limited to this example. For instance, two wedge-shaped prisms may be put together to form the beam splitting prism as shown in FIG. 4a, or two flat plates may be put together as shown in FIG. 4b. In short, the beam splitting prism may be one which, being adhered to the oblique surface of the right-angled triangular prism 15, has two reflector surfaces which exist in different planes and which are different from the adhered surface, as far as it provides the function that the P-polarized light transmitted through the polarizing membrane 17 is spatially split into two subpencil beams.

In the magneto-optical data reproducing device disposed to have a track extending along a direction parallel to the surface of the paper as shown in FIG. 1, the light beam is split along a direction parallel to the surface of the paper using one of the beam splitting prisms shown in FIGS. 2a, 2b, 2c, 4a and 4b, to obtain a tracking error signal according to push-pull detection. On the other hand, in a magneto-optical data reproducing device disposed to have a track extending along a direction normal to the surface of the paper, the direction of the beam splitting prism is determined in a manner such that the light beam is split along a direction parallel to the surface of the paper so as to obtain a tracking error signal according to the push-pull detection.

In the above example, the magneto-optical data reproducing device has the constitution shown in FIG. 1. This constitution is only for simplifying the explanation, but does not provide any restriction on the present invention.

Figure 5:
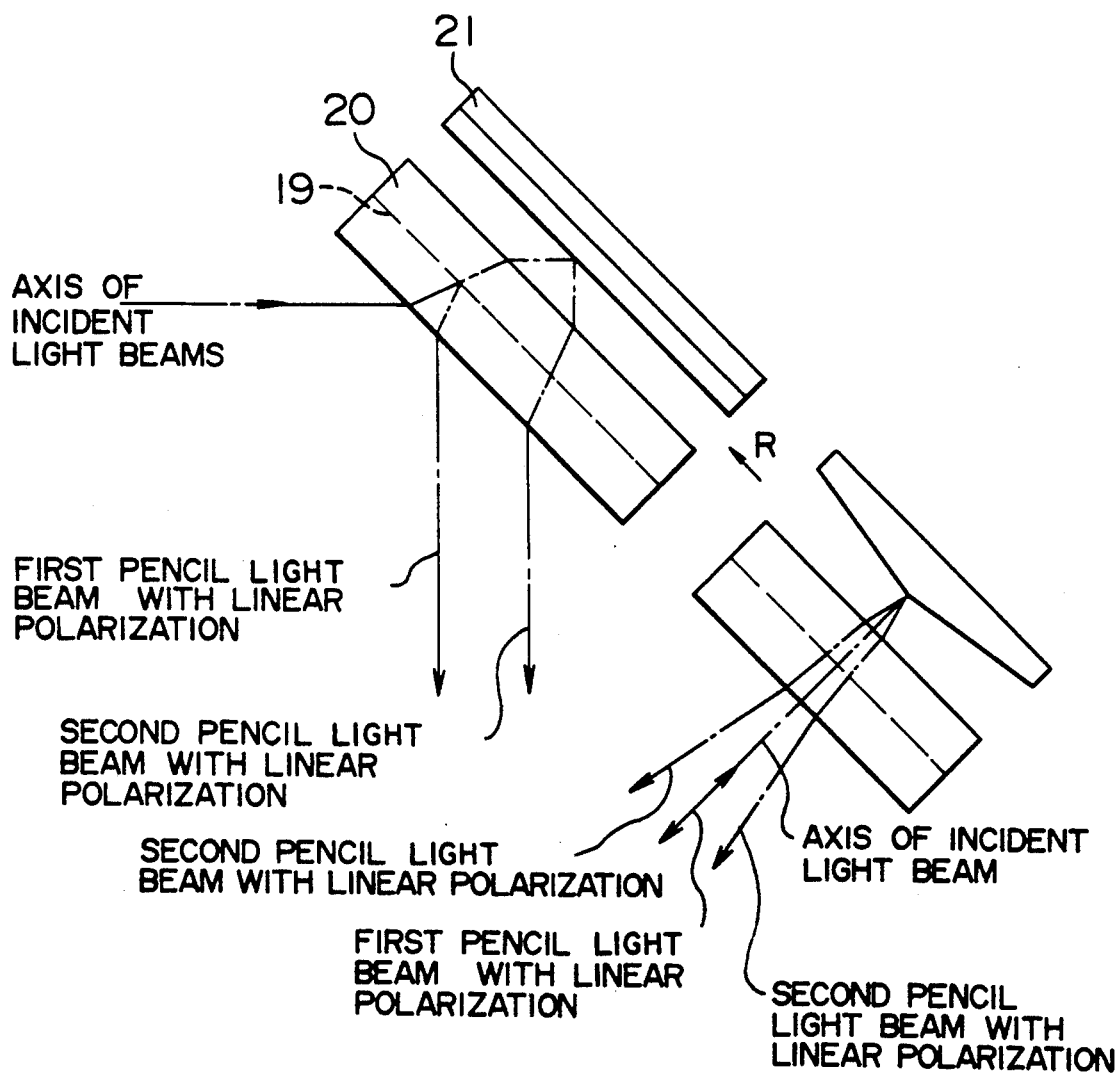
FIG. 5 is a schematic view of a generic beam detecting means in the present invention.

In the purpose of the present invention, as illustrated in FIG. 5 which is a schematic view of a generic beam detecting means, it is enough to dispose two constituents, one of which is the beam detecting prism 20 equipped with a polarizing faculty 19 for reflecting a predetermined first pencil beam with linear polarization while transmitting a second pencil beam with linear polarization crossing the first pencil at right angles, and the other of which is a beam splitting prism 21, being located near or adhered to the beam detecting prism 20, for splitting the second pencil beam with linear polarization transmitted through the beam detecting prism 20 into two subpencil beams with approximately the same quantity of light, reflecting the split subpencil beams and then re-applying them to the beam detecting prism 20 to form two optical axes extending along approximately the same direction as that of the first pencil beam with linear polarization.

What is claimed is:

1. A magneto-optical data recording and reproducing device for storing data in a data memory medium which modulates a polarization plane of an incident light beam, erasing data therefrom and reproducing data stored therein, comprising:

a light source for emitting a light beam having a linear polarization, a light spot forming means for condensing said light beam emitted from said light source and forming a light spot on said data memory medium, a beam splitting means, located between said light source and said light spot forming means, for receiving and splitting a reflected light beam from said data memory medium, a beam detecting prism, onto which the light beam split by said beam splitting means is applied, for providing a polarizing function such that a predetermined first pencil light beam with a first linear polarization is reflected while a second pencil light beam with a second linear polarization orthogonal to said first linear polarization is transmitted, a beam splitting prism, located adjacent to said beam detecting prism and including two reflecting surfaces which are disposed respectively in different planes, for splitting, by reflection, said second pencil light beam transmitted through said beam detecting prism into two subpencil light beams having approximately a same quantity of light, said two split subpencil light beams being adapted to be used to produce a tracking error signal, and then for re-applying them to said beam detecting prism to form two optical axes extending along approximately a same direction as that of said first pencil light beam, a focusing means for receiving said first pencil light beam and said two subpencil light beams which have passed through said beam detecting prism and said beam splitting prism and for focusing them;

at least one photo detector onto which said focusing means focuses said first pencil light beam and said two subpencil light beams, for producing an output signal including a data signal component, and a tracking error signal component based on said two subpencil light beams, a data retrieval unit for detecting data stored in said data memory medium in accordance with said data signal component of said output signal of said photo detector, a tracking servo unit to which said tracking error signal component is applied, and a driving means for driving at least said light spot forming means in response to an output signal from said tracking servo unit.

2. The magneto-optical data recording and reproducing device as claimed in claim 1, wherein said beam detecting prism is a right-angled trianglar prism providing a polarizing function on its oblique surface.

3. The magneto-optical data recording an reproducing device as claimed in claim 1, wherein said beam splitting prism is one which splits the second pencil light beam into two subpencil light beams along a direction approximately parallel with a memory track of said data memory medium.

4. The magneto-optical data recording and reproducing device as claimed in claim 1, wherein a beam condensing means is located one of (i) in front of or (ii) at the rear of said beam detecting prism and said beam splitting prism.

5. The device as claimed in claim 1, wherein said beam splitting prism is adhered to said beam detecting prism.

* * * * *